(12) United States Patent
Liu et al.

(10) Patent No.: US 10,214,423 B2
(45) Date of Patent: Feb. 26, 2019

(54) PREPARATION OF CARBON NANOTUBE SHELL MATERIALS

(71) Applicant: SABIC Global Technologies B.V., Bergen op Zoom (NL)

(72) Inventors: Yunyang Liu, Thuwal (SA); Ihab N. Odeh, Sugar Land, TX (US)

(73) Assignee: SABIC Global Technologies B.V., Bergen op Zoom (NL)

(*) Notice: Subject to any disclaimer, the term of this patent is extended or adjusted under 35 U.S.C. 154(b) by 3 days.

(21) Appl. No.: 15/531,576

(22) PCT Filed: Oct. 5, 2016

(86) PCT No.: PCT/US2016/055478
§ 371 (c)(1),
(2) Date: May 30, 2017

(87) PCT Pub. No.: WO2017/074667
PCT Pub. Date: May 4, 2017

(65) Prior Publication Data
US 2018/0297849 A1   Oct. 18, 2018

Related U.S. Application Data

(60) Provisional application No. 62/246,363, filed on Oct. 26, 2015.

(51) Int. Cl.
*C01B 32/16* (2017.01)
*H01M 4/587* (2010.01)
(Continued)

(52) U.S. Cl.
CPC .............. *C01B 32/16* (2017.08); *B01J 13/02* (2013.01); *B01J 13/04* (2013.01); *B01J 21/185* (2013.01);
(Continued)

(58) Field of Classification Search
CPC ......... C01B 32/16; B01J 13/04; B01J 21/185; B01J 35/04; B01J 35/08; B01J 35/008;
(Continued)

(56) References Cited

U.S. PATENT DOCUMENTS

2009/0101964 A1   4/2009   Choi et al. ................... 257/324
2012/0088123 A1   4/2012   Choi et al. ................... 428/688

FOREIGN PATENT DOCUMENTS

CN   102448880 A   5/2012

OTHER PUBLICATIONS

Mondal, Chanchal, et al. "Synthesis of multiwall carbon nanotube wrapped Co (OH) 2 flakes: A high-performance supercapacitor." Applied Surface Science 359 (2015): 500-507.*

(Continued)

*Primary Examiner* — Richard M Rump
(74) *Attorney, Agent, or Firm* — Norton Rose Fulbright US LLP

(57) ABSTRACT

Methods of making a carbon nanotube material and uses thereof are described. The methods can include obtaining a carbon-containing polymeric matrix shell having a single discrete void space defined by the carbon-containing polymeric matrix shell or having an encapsulated core and subjecting the carbon-containing polymeric matrix shell to a graphitization process to form a shell having a carbon nanotube network from the matrix. The resulting carbon nanotube material includes a shell having a network of carbon nanotubes and either (i) a single discrete void space defined by the network of carbon nanotubes or (ii) the encapsulated core surrounded by the network of carbon nanotubes.

17 Claims, 8 Drawing Sheets

(51) Int. Cl.

| | | |
|---|---|---|
| *H01M 4/36* | (2006.01) | |
| *C01B 32/158* | (2017.01) | |
| *B01J 13/02* | (2006.01) | |
| *B01J 13/04* | (2006.01) | |
| *B01J 21/18* | (2006.01) | |
| *B01J 35/00* | (2006.01) | |
| *B01J 35/04* | (2006.01) | |
| *B01J 35/08* | (2006.01) | |
| *B01J 37/00* | (2006.01) | |
| *B01J 37/08* | (2006.01) | |
| *H01G 11/36* | (2013.01) | |
| *H01M 4/96* | (2006.01) | |
| *B82Y 40/00* | (2011.01) | |
| *B01D 53/94* | (2006.01) | |
| *B82Y 30/00* | (2011.01) | |

(52) U.S. Cl.
CPC .............. *B01J 35/008* (2013.01); *B01J 35/04* (2013.01); *B01J 35/08* (2013.01); *B01J 37/0018* (2013.01); *B01J 37/084* (2013.01); *C01B 32/158* (2017.08); *H01G 11/36* (2013.01); *H01M 4/366* (2013.01); *H01M 4/587* (2013.01); *H01M 4/96* (2013.01); *B01D 53/944* (2013.01); *B01D 53/945* (2013.01); *B01D 2255/702* (2013.01); *B82Y 30/00* (2013.01); *B82Y 40/00* (2013.01); *C01P 2004/34* (2013.01)

(58) Field of Classification Search
CPC ..... B01J 37/0018; B01J 37/084; H01G 11/36; H01M 4/366; H01M 4/587; H01M 4/96; B01D 53/944; B01D 53/945; B01D 2255/702; B82Y 30/00; B82Y 40/00; C01P 2004/34
See application file for complete search history.

(56) References Cited

OTHER PUBLICATIONS

Kim, YunKyoung, et al. "Aerosol Approach for Hollow Spheres of a Porous 3D Carbon Nanotube/CuO Network and Their Anodic Properties for Lithium-Ion Battery." Journal of nanoscience and nanotechnology 14.12 (2014): 9143-9147.*
Ji, Lijun, et al. "Porous hollow carbon nanotube composite cages." Chemical Communications 11 (2006): 1206-1208.*
Liu et al., *Nature Materials*, 14, 763-774 (2015).
Li et al., *Colloids and Surfaces A: Physicochemical and Engineering Aspects*, 342, 107-114 (2009).
Kang et al., *RSC Advances*, 4, 26166-26170 (2014).
Zhang et al., *Journal of Materials Science*, 46, 1947-1956 (2014).
Chen et al., *J. Mater. Chem. A*, 1, 1045-1047 (2013).
Fuertes et al., *Carbon*, 40.9 (2002): 1600-1602.
Tee et al., *AIP Conference Proceedings*, 1217 (2010): 217-221.
Yang et al., *Ind. Eng. Chem. Res.*, 51.41 (2012): 13346-13353.
Iijima, *Nature*, 354 (1991): 56-58.
Ajayan et al., *Carbon Nanotubes* (2002): 391-425.
Sano et al., *Nano Letters*, 2 (2002): 531-533.
Nguyen et al., *Carbon*, 48 (2010): 2910-2916.
Tang et al., *The Journal of Physical Chemistry C*, 113 (2009): 1666-1671.
Zhang et al., *Angewandte Chemie International Edition*, 51 (2012): 7581-7585.
International Search Report and Written Opinion for PCT/US2016/055478, dated Jan. 17, 2017.
Fang et al., *Nanoscale*, 5, 6908-6916 (2013).
Ouyang et al., *Scientific Reports*, 3, 1430 (2013).
Shao et al., *Journal of Electroanalytical Chemistry*, 727, 8-12 (2014).
Xi et al., *J. Phys. Chem. B*, 109, 13200-13204 (2005).
Zhou et al., *Electrochimica Acta*, 87, 663-668 (2013).

* cited by examiner

PREPARATION OF CARBON NANOTUBE SHELL MATERIALS

CROSS REFERENCE TO RELATED APPLICATIONS

This application is a national phase application under 35 U.S.C. § 371 of International Application No. PCT/US2016/055478 filed Oct. 5, 2016, which claims priority to U.S. Provisional Patent Application No. 62/246,363 filed Oct. 26, 2015. The entire contents of each of the above-referenced disclosures are specifically incorporated herein by reference without disclaimer.

BACKGROUND OF THE INVENTION

A. Field of the Invention

The invention generally concerns carbon nanotubes (CNTs). In particular, a method of making a structured carbon nanotube (CNT) shell or cage material is disclosed. The CNT shell can further include a core or yolk encapsulated within the CNT shell.

B. Description of Related Art

Carbon nanotubes (CNTs) are nanometer-scale tubular-shaped graphene structures that have extraordinary mechanical, chemical, optical and electrical properties (See, Iijima, "Helical microtubules of graphitic carbon", *Nature*, 1991, 354:56-58, "Iijima"). By way of example, CNTs have been shown to exhibit good electrical conductivity and tensile strength, including high strain to failure and relatively high tensile modulus. CNTs have also been shown to be highly resistant to fatigue, radiation damage, and heat. These properties make CNTs a material that can be used in a variety of applications (e.g., conductive, electromagnetic, microwave, absorbing, high-strength composites, super capacitor, battery electrodes, catalyst and catalyst supports, field emission displays, transparent conducting films, drug delivery systems, electronic devices, sensors and actuators).

Several different processes for making CNTs have been developed over the years. Generally, the three main methods are: (1) arc discharge method (See, Iijima), (2) laser ablation method (See, Ebbesen et al., "Large-scale Synthesis of Carbon Nanotubes", *Nature*, 1992, 358:220), and (3) chemical vapor deposition (CVD) method (See, Li, "Large-scale Synthesis of Aligned Carbon Nanotubes", *Science*, 1996, 274:1701). Other CNT production methods have also been developed. For instance, Zhang et al., "Spherical Structures Composed of Multiwalled Carbon Nanotubes: Formation Mechanism and Catalytic Performance" *Angew. Chem. Int. ed.*, 2012, 51:7581-7585, discloses a process to produce a solid CNT monolith as an alternative to the more typical chemical-vapor-deposition (CVD) process and indicates that its process would allow for large scale production of CNTs.

Despite all of the currently available research on CNTs, utilization of their unique properties has yet to be fully realized. This is due, in part, to the structural limitations currently seen with CNT-based materials. In particular, while the above CNT production processes can be used to produce CNTs, these processes are limited and typically do not allow for the preparation of CNTs having desired structural properties. This has led to research in producing structured CNT-based materials such as CNT shells or cages, which can find use in a wide array of applications (e.g., energy storage applications (e.g., secondary batteries) or catalytic chemistry reactions). The currently available processes for producing such structured CNT-based materials, however, can be complicated, time consuming, and expensive. By way of example, Sano et al., "Noncovalent Self-Assembly of Carbon Nanotubes for Construction of 'Cages'", *Nano Letters,* 2002, 2:531-533, discloses a process for making a hollow spherical cage of nested single-walled carbon nanotubes by adsorbing nanotubes onto amine-terminated silica gels in solution, drying the solution and then performing a re-adsorption cycle to grow a nanotube nest layer-by-layer. The silica is removed by etching to give way to produce hollow cages. In another example, Nguyen et al., "Synthesis of sea urchin-like particles of carbon nanotubes directly grown on stainless steel cores and their effect on the mechanical properties of polymer composites", *Carbon,* 2010, 48, 2910-2916, describes growing multi-walled carbon nanotubes on spherical stainless steel particles to produce a structure that resembled sea urchins. In still another example, Tang et al., "Hollow Carbon Nanotube Microspheres and Hemimicrospheres", *The Journal of Physical Chemistry C,* 2009, 113:1666-1671 describes a layer-by layer (LBL) assembly of multiwalled carbon nanotubes and diazoresin using electrostatic interactions on planar substrates and polystyrene cores. The polystyrene cores were removed by calcination of the structure to produce a hollow multiwalled microsphere.

SUMMARY OF THE INVENTION

A discovery has been made that offers a solution to the current processes that are used to make structured CNT-based materials such as hollow CNT shell structures and core/CNT shell and yolk/CNT shell structures. In particular, the solution is premised on obtaining a carbon-containing polymeric matrix shell having a single discrete void space defined by the carbon-containing polymeric matrix shell, or having an encapsulated core, and subjecting the carbon-containing polymeric matrix shell to a graphitization process to directly convert the polymeric matrix into a network of CNTs (i.e., a CNT shell). If a core is present in the process, then a core/CNT shell structure can be obtained. Still further, the core can be partially etched to produce a yolk/CNT shell structure. The graphitization process results in a CNT network that can consist essentially of or consist of CNTs. In addition, the network also has good flow flux properties due to inherent spacing between the CNTs of the network and/or the hollow nature of CNTs, thereby providing access for chemicals to enter and exit the internal portion of the CNT shell (i.e., the void space, core, or yolk). Further, the processes used to make the CNT materials of the present invention allow for the introduction of a wide range of structural modifications or tunability to the materials. By way of example, the overall size and/or shape of the CNT material can be designed as needed (e.g., spherical, square, pyramid, etc.). Even further, the volume and/or shape of the discrete void space, core, or yolk can also be tuned as desired, with a spherical shape being preferred in some instances. Still further, other tunable options that can be implemented include modifying the thickness of the CNT network shell, the type of nanostructures included in the shell, the introduction of nanostructures into the CNT network itself, surface loading of the CNT materials, etc. Stated plainly, the processes of making the CNT materials of the present invention can be tuned to introduce a number of desired structural features in the resulting CNT materials/structures.

In one embodiment of the present invention, a method of making a carbon nanotube shell material of the present invention is disclosed. The method can include (a) obtaining a carbon-containing polymeric matrix shell having a single discrete void space defined by the carbon-containing polymeric matrix shell or having an encapsulated core and (b) subjecting the carbon-containing polymeric matrix to a graphitization process to form a shell having a carbon nanotube network from the matrix. From this method a carbon nanotube shell material can be obtained that includes a shell having a network of carbon nanotubes and either (i) a single discrete void space defined by the network of carbon nanotubes (i.e., a hollow CNT shell) or (ii) the encapsulated core surrounded by the network of carbon nanotubes (i.e., a core/CNT shell). The shell can have a network of carbon nanotubes (e.g., single and/or multi-walled) that allows chemicals in the form of gases and fluids to flow into and out of the carbon nanotube material. In a particular embodiment, the shell having the network of carbon nanotubes consists essentially of or consists of carbon nanotubes. The volume of the void space or the encapsulated core can range from 1 $nm^3$ to $10^6$ $\mu m^3$. The carbon nanotube material can be a substantially spherical particle having a diameter of 1 nm to 100,000 nm (100 μm). A diffusion transport (flow flux or permeability) of the shell can range from $1 \times 10^{-6}$ to $1 \times 10^{-4}$ mol $m^{-2}s^{-1}Pa^{-1}$. The carbon-containing polymeric matrix shell in step (a) can have catalytic metal ions or has exchangeable ions that are exchanged for catalytic metal ions, the catalytic metal ions being capable of catalyzing the formation of the network of carbon nanotubes from the polymeric matrix shell during the step (b) graphitization process. In some embodiments, the catalytic metal ions are loaded into the polymeric matrix shell prior to or during step (b) graphitization process. The carbon-containing polymeric matrix shell in step (a) can include any polymer having ion exchange capabilities (e.g., a functionalized polystyrene polymer, a functionalized siloxane-based polycarbonate polymer, or a combination thereof). The carbon-containing polymeric matrix can be cross-linked with a cross-linking agent (e.g., divinylbenzene), non-crosslinked, or cross-linked during the graphitization process. The graphitization process can include heating the composition to a temperature of 400 to 1000° C. under an inert atmosphere for a sufficient period of time (e.g., 1 minute to 50 hours). In embodiments where the carbon-containing polymeric matrix shell in step (a) is the carbon-containing polymeric matrix shell having the single discrete void space, this shell can be obtained by emulsion polymerization of a carbon-containing compound. In embodiments where the carbon-containing polymeric matrix shell in step (a) is the carbon-containing polymeric matrix shell having the encapsulated core, this polymeric matrix/core structure can be obtained by dispersing a core material in a solution that includes a carbon-containing compound and polymerizing the compound such that a polymeric matrix is formed around and encapsulates the core. The carbon-containing compounds that can be used include any carbon-containing compound capable of forming a polymer. In certain preferred instances, polymers having ion exchange capabilities can be used (e.g., a functionalized styrene compound or a functionalized siloxane-based carbonate compound, or a combination thereof). The solution can also include a cross-linking agent, preferably divinylbenzene. In some aspects, the core material can be a nano- or microstructure, preferably a nanostructure, and more preferably a nanoparticle. In particular aspects, the core material can catalyze the formation of the network of carbon nanotubes during the step (b) graphitization step. In instances where a core/CNT shell material is obtained, the material can be further subjected to an etching process to partially or fully remove the core such that a yolk/CNT shell structure or a hollow CNT shell structure is obtained. When the encapsulated core material is fully etched away, little to no core material is left in the void space and a hollow CNT shell remains. By comparison, partial etching can be performed for a desired period of time to obtain a desired size of the core or yolk. In one instance, the encapsulated core material can be partially etched away such that the encapsulated core fills 1% to 99%, preferably 30% to 60%, of the void space in the CNT shell. In a particular embodiment, the encapsulated core material can be particle having a diameter of 1 nm to $1 \times 10^2$ μm, preferably 1 nm to 50 nm, or more preferably 1 nm to 5nm. The metal nano- or microstructure can include 1, 2, or multiple metals (e.g., a metal, a bimetallic metal, or a multi-metal). The core material can include a metal nano- or microstructure or oxides or alloys thereof, a silicon nano- or microstructure, a carbon-containing nano- or microstructure, a metal oxide nanoparticle, a metal organic framework nano- or microstructure, a zeolitic imidazolated framework nano- or microstructure, a covalent organic framework nano- or microstructure, a zeolite nano- or microstructure or any combination thereof. A metal nano-or microstructure can include a noble metal (e.g. silver (Ag), palladium (Pd), platinum (Pt), gold (Au), rhodium (Rh), ruthenium (Ru), rhenium (Re), or iridium (Ir), or any combinations or alloys thereof), a transition metal (e.g., copper (Cu), iron (Fe), nickel (Ni), zinc (Zn), manganese (Mn), chromium (Cr), molybdenum (Mo), tungsten (W), osmium (Os), or tin (Sn), or any combinations or oxides or alloys thereof), or both. Non-limiting examples of metal oxide nano- or microstructures include silica ($SiO_2$), alumina ($Al_2O_3$), titania ($TiO_2$), zirconia ($ZrO_2$), germania ($GeO_2$), stannic oxide ($SnO_2$), gallium oxide ($Ga_2O_3$), zinc oxide (ZnO), hafnia ($HfO_2$), yttria ($Y_2O_3$), lanthana ($La_2O_3$), ceria ($CeO_2$), or any combinations or alloys thereof. The carbon-based nano- or microstructure can include carbon nanotubes.

Methods for using the previously described carbon nanotube material are described. One method can include contacting the catalyst with a reactant feed to catalyze the reaction and produce a product feed. The chemical reaction can include a hydrocarbon hydroforming reaction, a hydrocarbon cracking reaction, a hydrogenation of hydrocarbon reaction, and/or a dehydrogenation of hydrocarbon reaction or any combination thereof. In some embodiments, the carbon nanotube material can be used in automotive 3-way catalysis (e.g., catalytic converters), diesel oxidation catalysis, environmental remediation catalysis, energy storage applications (e.g., fuel cells, batteries, supercapacitors, and electrochemical capacitors), optical applications, and/or controlled release applications. In one particular instance the carbon nanotube material of the present invention can be incorporated into a secondary or rechargeable battery. For example, it could be used in the cathode of the secondary battery. The secondary battery can be a lithium-ion or lithium-sulfur battery.

In yet another aspect, a system for producing a chemical product is disclosed. The system can include (a) an inlet for a reactant feed; (b) a reaction zone that is configured to be in fluid communication with the inlet, wherein the reaction zone includes the carbon nanotube material having the core-shell structure described throughout the specification; and (c) an outlet configured to be in fluid communication with the reaction zone and configured to remove a product stream from the reaction zone. The reaction zone can be a continuous flow reactor (e.g., a fixed-bed reactor, a fluidized reactor, or a moving bed reactor).

Also disclosed in the context of the present invention are embodiments 1-45. Embodiment 1 is a method of making a carbon nanotube material, the method comprising: (a) obtaining a carbon-containing polymeric matrix shell having a single discrete void space defined by the carbon-containing polymeric matrix shell or having an encapsulated core; and (b) subjecting the carbon-containing polymeric matrix shell to a graphitization process to form a shell having a carbon nanotube network from the matrix, wherein a carbon nanotube material is obtained that includes a shell having a network of carbon nanotubes and either (i) a single discrete void space defined by the network of carbon nanotubes or (ii) the encapsulated core surrounded by the network of carbon nanotubes. Embodiment 2 is the method of embodiment 1, wherein the shell having the network of carbon nanotubes consists essentially of or consists of carbon nanotubes. Embodiment 3 is the method of any one of embodiment 1 to 2, wherein the shell having the network of carbon nanotubes is a monolith network of carbon nanotubes. Embodiment 4 is the method of any one of embodiments 1 to 3, wherein the carbon-containing polymeric matrix shell in step (a) has catalytic metal ions or has exchangeable ions that are exchanged for catalytic metal ions, the catalytic metal ions being capable of catalyzing the formation of the network of carbon nanotubes from the polymeric matrix shell during the step (b) graphitization process. Embodiment 5 is the method of embodiment 4, wherein catalytic metal ions are loaded into the polymeric matrix shell prior to or during the step (b) graphitization process. Embodiment 6 is the method of any one of embodiments 4 to 5, further comprising removing catalytic metal ions from the carbon nanotube network shell after the step (b) graphitization process. Embodiment 7 is the method of any one of embodiments 1 to 6, wherein the carbon containing polymeric matrix shell in step (a) comprises a polymer having ion exchange capabilities. Embodiment 8 is the method of embodiment 7, wherein the polymer having ion exchange capabilities is a functionalized polystyrene polymer, a functionalized siloxane-based polycarbonate polymer, or a combination thereof. Embodiment 9 is the method of any one of embodiments 1 to 8, further comprising cross-linking the polymeric matrix shell in step (a) or in step (b), or in both steps (a) and (b), preferably with divinylbenzene. Embodiment 10 is the method of any one of embodiments 1 to 8, wherein the polymeric matrix is not cross-linked in either of steps (a) and (b). Embodiment 11 is the method of any one of embodiments 1 to 10, wherein the step (b) graphitization process comprises heating the carbon-containing polymeric matrix shell for 400° C. to 1000° C. for a sufficient period of time, or from 1 minute to 50 hours, to form the shell having a carbon nanotube network. Embodiment 12 is the method of embodiment 11, further comprising contacting the carbon-containing polymeric matrix shell with a noble gas during the heating step. Embodiment 13 is the method of any one of embodiments 1 to 12, wherein the carbon-containing polymeric matrix shell in step (a) is the carbon-containing polymeric matrix shell having the single discrete void space, and wherein a hollow CNT shell structure is obtained having the network of carbon nanotubes and the single discrete void space defined by the network of carbon nanotubes. Embodiment 14 is the method of embodiment 13, wherein the carbon-containing polymeric matrix shell having the single discrete void space is obtained by emulsion polymerization of a carbon-containing compound. Embodiment 15 is the method of any one of embodiments 1 to 12, wherein the carbon-containing polymeric matrix shell in step (a) is the carbon-containing polymeric matrix shell having the encapsulated core, and wherein a core/CNT shell structure is obtained having the network of carbon nanotubes and the encapsulated core surrounded by the network of carbon nanotubes. Embodiment 16 is the method of embodiment 15, wherein the carbon-containing polymeric matrix shell having the encapsulated core is obtained by dispersing a core material in a solution comprising a carbon-containing compound and polymerizing the compound to form a shell around the encapsulated core. Embodiment 17 is the method of any one of embodiments 15 to 16, wherein the core material is a nano- or microstructure, preferably a nanostructure, and more preferably a nanoparticle. Embodiment 18 is the method of embodiment 17, wherein the core material catalyzes the formation of the network of carbon nanotubes during the step (b) graphitization step. Embodiment 19 is the method of any one of embodiments 15 to 18, further comprising partially etching away the encapsulated core surrounded by the network of carbon nanotubes such that encapsulated core fills 1% to 99%, preferably 30% to 60%, of the volume of the void space. Embodiment 20 is the method of embodiment 19, wherein the produced carbon nanotube material has a yolk/CNT shell structure. Embodiment 21 is the method of any one of embodiments 15 to 20, wherein the encapsulated core comprises a metal nano- or microstructure or oxides or alloys thereof, a silicon nano- or microstructure, a carbon-containing nano- or microstructure, a metal oxide nanoparticle, a metal organic framework nano- or microstructure, a zeolitic organic framework nano- or microstructure, a covalent organic framework nano- or microstructure, or a zeolite nano- or microstructure, or any combination thereof. Embodiment 22 is the method of embodiment 21, wherein metal nano- or microstructure alloys thereof comprises one or more metals. Embodiment 23 is the method of any one of embodiments 21 to 22, wherein the metal nano- or microstructure comprises a noble metal selected from silver (Ag), palladium (Pd), platinum (Pt), gold (Au), rhodium (Rh), ruthenium (Ru), rhenium (Re), or iridium (Ir), or any combinations or oxides or alloys thereof. Embodiment 24 is the method of embodiment 23, wherein the metal nano- or microstructure is a transition metal selected from copper (Cu), iron (Fe), nickel (Ni), zinc (Zn), manganese (Mn), chromium (Cr), molybdenum (Mo), tungsten (W), osmium (Os), or tin (Sn), or any combinations or oxides or alloys thereof. Embodiment 25 is the method of embodiment 23, wherein the metal oxide nano- or microstructure is a metal oxide selected from silica ($SiO_2$), alumina ($Al_2O_3$), titania ($TiO_2$), zirconia ($ZrO_2$), germania ($GeO_2$), stannic oxide ($SnO_2$), gallium oxide ($Ga_2O_3$), zinc oxide (ZnO), hafnia ($HfO_2$), yttria ($Y_2O_3$), lanthana ($La_2O_3$), ceria ($CeO_2$), or any combinations or alloys thereof. Embodiment 26 is the method of any one of embodiments 22 to 25, wherein the metal nano- or microstructure is a bimetallic or trimetallic structure. Embodiment 27 is the method of embodiment 21, wherein the carbon-containing nano- or microstructure is a carbon nanotube. Embodiment 28 is the method of any one of embodiments 15 to 27, wherein the encapsulated core is a particle having a diameter of 1 nm to 100000 nm, preferably 1 nm to 5000 nm, or more preferably 1 nm to 500 nm. Embodiment 29 is the method of any one of embodiments 15 to 28, further comprising fully etching away the encapsulated core surrounded by the network of carbon nanotubes to obtain a carbon nanotube material that includes the shell having the network of carbon nanotubes and the single discrete void space defined by the network of carbon nanotubes. Embodiment 30 is the method of any one of embodiments 1 to 29, wherein the average volume of the single discrete void space or the encapsulated core is 1 $nm^3$ to $1\times10^6$ $\mu m^3$. Embodiment 31 is the method of any one of embodiments 1 to 30, wherein the shell having the network of carbon nanotubes has a flow flux of $1\times10^{-6}$ to $1\times10^{-4}$ mol·m$^{-2}$s$^{-1}$Pa$^{-1}$. Embodiment 32 is the method of any one of embodiments 1 and 3 to 34, wherein the shell having the network of carbon nanotubes further comprises a polymer, a metal, a metal oxide, silicon, a metal organic framework, a zeolitic organic framework, a covalent organic framework, a zeolite or any combination thereof dispersed throughout the network. Embodiment 33 is the method of any one of embodiments 1 to 32, wherein the produced carbon nanotube material is a substantially spherical particle having a diameter of 10 nm to 100 µm. Embodiment 34 is the method of any one of embodiments 1 to 33, wherein the carbon nanotubes in the network are single-walled carbon nanotubes, multi-walled carbon nanotubes, or a combination thereof.

Embodiment 35 is a carbon nanotube material obtained by the method of any one of embodiments 1 to 34. Embodiment 36 is the carbon nanotube material of embodiment 35, further comprised in an energy storage device. Embodiment 37 is the carbon nanotube material of embodiment 36, wherein the energy storage device is a battery. Embodiment 38 is the carbon nanotube material of embodiment 37, wherein the material is comprised in a cathode of the battery. Embodiment 39 is the carbon nanotube material of any one of embodiments 37 to 38, wherein the battery is a rechargeable battery. Embodiment 40 is the energy storage device of embodiment 39, wherein the rechargeable battery is a lithium-ion or lithium-sulfur battery. Embodiment 41 is the carbon nanotube material of embodiment 35, further comprised in a controlled released device, a fuel cell, or a supercapacitor.

Embodiment 42 is a method for using the carbon nanotube material of embodiment 35 in a chemical reaction, the method comprising contacting the material with a reactant feed to catalyze the reaction and produce a product feed. Embodiment 43 is the method of embodiment 42, wherein the chemical reaction comprises a hydrocarbon cracking reaction, a hydrogenation of hydrocarbon reaction, and/or a dehydrogenation of hydrocarbon reaction, 3-way catalytic environmental mitigation reaction for automobiles, or air remediation reactions.

Embodiment 44 is a system for producing a chemical product, the system comprising: (a) an inlet for a reactant feed; (b) a reaction zone that is configured to be in fluid communication with the inlet, wherein the reaction zone comprises the carbon nanotube material of embodiment 35; and (c) an outlet configured to be in fluid communication with the reaction zone and configured to remove a product stream from the reaction zone. Embodiment 45 is the system of embodiment 44, wherein the reaction zone is a continuous flow reactor selected from a fixed-bed reactor, a fluidized reactor, or a moving bed reactor.

The following includes definitions of various terms and phrases used throughout this specification.

The phrase "distinct void space" refers to a separate empty space present within a polymeric matrix shell or present within a carbon nanotube network shell. The boundary of the void space is defined by the polymeric matrix or the carbon nanotube network, respectively. In instances where the distinct void space is present in a carbon nanotube network shell, the distinct void space is greater than any inherent spacing between the outer walls of two or more adjacent carbon nanotubes in the network and is also different from the hollow channels that are inherently present in carbon nanotubes. In preferred instances, the volume of each discrete void space is 1 nm$^3$ to $10^6$ µm$^3$ and/or each discrete void space is substantially spherical.

A carbon nanotube network or CNT network or CNT shell includes a plurality of individual carbon nanotubes that form a network or matrix of CNTs. The CNTs within a CNT network of the present invention can be in contact with one another, can be aligned in substantially the same direction, and/or can be randomly oriented. In a preferred aspect, the CNT network has a substantially spherical shape and consists essentially of or consists of a plurality of CNTs.

A core/CNT shell material (or structure) or encapsulated core/CNT shell material (or structure) of the present invention has a carbon nanotube network with an individual core, where the core (i.e., a nanostructure, preferably a nanoparticle) is encompassed within the carbon nanotube network and at least 50% to 100%, preferably 60% to 90% of the surface of the core contacts the carbon nanotube network. A non-limiting illustration of a core/CNT shell structure of the present invention is provided in FIG. 1.

A yolk/CNT shell material (or structure) or encapsulated yolk/shell material (or structure) of the present invention has a carbon nanotube network with an individual yolk, where the yolk (i.e., a nanostructure, preferably a nanoparticle) is encompassed within the carbon nanotube network and less than 50% of the surface of the yolk contacts the carbon nanotube network. Non-limiting illustrations of two types of yolk/CNT shell structures of the present invention are provided in FIGS. 2A and 2B.

A hollow CNT shell material (or structure) or hollow CNT cage material (or structure) or void/CNT shell material (or structure) of the present invention has a carbon nanotube network with a discrete void space contained within and surrounded by the network, wherein the boundary of the void space is defined by the carbon nanotube network. A non-limiting illustration of a hollow CNT shell material of the present invention is provided in FIG. 3.

Determination of whether a core, yolk, or void space is present in the carbon nanotube materials of the present invention can be made by persons of ordinary skill in the art. One example is visual inspection of a transition electron microscope (TEM) or a scanning transmission electron microscope (STEM) image of a carbon nanotube material of the present invention and determining whether a void space is present or determining whether at least 50% (core) or less (yolk) of the surface of a given nanostructure (preferably a nanoparticle) contacts the carbon nanotube network.

"Nanostructure" refers to an object or material in which at least one dimension of the object or material is equal to or less than 1000 nm (e.g., one dimension is 1 to 1000 nm in size). In a particular aspect, the nanostructure includes at least two dimensions that are equal to or less than 1000 nm (e.g., a first dimension is 1 to 1000 nm in size and a second dimension is 1 to 1000 nm in size). In another aspect, the nanostructure includes three dimensions that are equal to or less than 1000 nm (e.g., a first dimension is 1 to 1000 nm in size, a second dimension is 1 to 1000 nm in size, and a third dimension is 1 to 1000 nm in size). The shape of the nanostructure can be of a wire, a particle (e.g., having a substantially spherical shape), a rod, a tetrapod, a hyperbranched structure, a tube, a cube, or mixtures thereof. "Nanoparticles" include particles having an average diameter size of 1 to 1000 nanometers.

"Microstructure" refers to an object or material in which at least one dimension of the object or material is greater than 1000 nm (e.g., greater than 1000 nm up to 5000 nm) and in which no dimension of the structure is 1000 nm or smaller. The shape of the microstructure can be of a wire, a particle, a sphere, a rod, a tetrapod, a hyper-branched structure, a tube, a cube, or mixtures thereof. "Microparticles" include particles having an average diameter size of greater than 1000 nm, preferably greater than 1000 nm to 5000 nm, or more preferably greater than 1000 nm to 10000 nm.

The term "about" or "approximately" are defined as being close to as understood by one of ordinary skill in the art. In one non-limiting embodiment the terms are defined to be within 10%, preferably within 5%, more preferably within 1%, and most preferably within 0.5%.

The term "substantially" and its variations are defined to include ranges within 10%, within 5%, within 1%, or within 0.5%.

The terms "inhibiting" or "reducing" or "preventing" or "avoiding" or any variation of these terms, when used in the claims and/or the specification includes any measurable decrease or complete inhibition to achieve a desired result.

The terms "wt. %", "vol. %", or "mol. %" refers to a weight, volume, or molar percentage of a component, respectively, based on the total weight, the total volume of material, or total moles, that includes the component. In a non-limiting example, 10 grams of component in 100 grams of the material is 10 wt. % of component.

The term "effective," as that term is used in the specification and/or claims, means adequate to accomplish a desired, expected, or intended result.

The use of the words "a" or "an" when used in conjunction with any of the terms "comprising," "including," "containing," or "having," in the claims or the specification may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The processes of the present invention can "comprise," "consist essentially of," or "consist of" particular steps, ingredients, components, compositions, etc. disclosed throughout the specification. With respect to the transitional phase "consisting essentially of," in one non-limiting aspect, a basic and novel characteristic of the processes of the present invention is the combination of obtaining a polymeric matrix shell having a single discrete void space or core encapsulated therein and converting the polymeric matrix shell into a carbon nanotube network/shell.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

Advantages of the present invention may become apparent to those skilled in the art with the benefit of the following detailed description and upon reference to the accompanying drawings.

Figure 1:
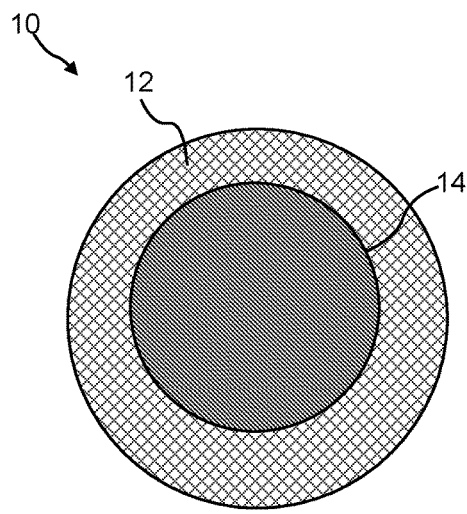
FIG. 1 is an illustration of a cross-sectional view of a core/CNT shell structure of the present invention.

While the invention is susceptible to various modifications and alternative forms, specific embodiments thereof are shown by way of example in the drawings and may herein be described in detail. The drawings may not be to scale.

DETAILED DESCRIPTION OF THE INVENTION

The present invention provides a solution to the current problems associated with preparing structured CNT-based materials having CNT shells. In particular, the processes of the present invention provide a scalable and tunable process for producing core/CNT shell structures, yolk/CNT shell structures, and hollow CNT shells. The tunability of these structures can be derived from the process used to make these structures, which allows for the creation of either (1) a core/CNT structure that can be further processed into a yolk/CNT structure or a hollow CNT shell or (2) a hollow CNT shell structure. Each of these structures can have any desired shape, although a substantially spherical shape is preferred (e.g. a particle having a diameter of 1 nm to 100,000 nm, 10 nm to 10,000 nm, or 100 nm to 1,000 nm or any range or value there between). In addition, the structures can be designed for any particular application (e.g., electrical storage applications, catalytic reactions, etc.). Still further, the CNT shells of the present invention have good flow flux properties due to the CNT network and the hollow channels of the individual CNTs, thereby allowing access to the core, yolk, and void spaces. In addition, the CNT shell/network can be tuned to have a desired thickness to maximize interfacial chemistry for any given application.

These and other non-limiting aspects of the present invention are discussed in further detail in the following sections with reference to the Figures.

A. CNT Structures of the Present Invention

1. Core/CNT Shell Structure

The core/CNT shell structure of the present invention includes a carbon nanotube shell that has a network of carbon nanotubes and an encapsulated core surrounded by the network. FIG. 1 is a cross-sectional view of an illustration of a core/CNT shell structure 10 having a carbon nanotube network shell 12, and core material 14. The shell 12 is a network of carbon nanotubes (e.g., a monolith). The carbon nanotubes in the network can be single wall nanotube, multi-wall nanotubes, or both. The core material 14 can be substantially or completely encapsulated in the carbon nanotube network. A diameter of the core material 14 can be 1 nm to 100,000 nm, 10 nm to 100 nm, 1 nm to 50 nm, or 1 nm to 5 nm, or 1, 2, 3, 4, 5, 6, 7, 8, 9, 10, 20, 30, 40, 50, 60, 70, 80, 90, 100, 150, 200, 250, 300, 350, 400, 450, 500, 550, 600, 650, 700, 750, 800, 850, 900, 950, 1000, 5000, 6000, 7000, 8000, 9000, 10000, 20000, 30000, 40000, 50000, 60000, 70000, 80000, 90000, 100000 nm, or any range or value there between. As shown, the encapsulated core material 14 is in full or substantially full contact with a portion of carbon nanotube network. In some embodiments, 50% to 100%, 50% to 99%, 60% to 95%, or 50%, 60%, 70%, 80%, 90%, 91%, 92%, 93%, 94%, 95%, 96%, 97%, 98%, 99%, 99.1%, 99.2%, 99.3%, 99.4%, 99.5%, 99.6%, 99.7%, 99.8%, 99.9%, or any range or value there between, of the surface of the core 14 contacts the shell 12.

2. Yolk/CNT Shell Structure

Figure 2A:
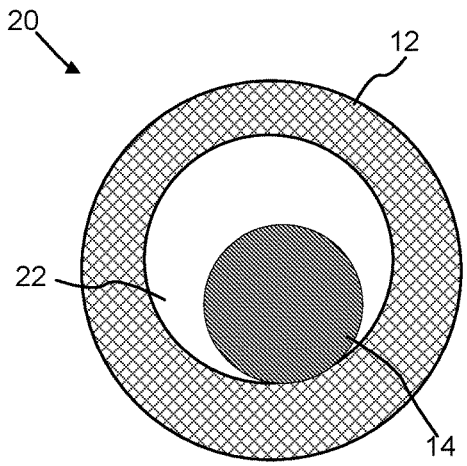
FIGS. 2A and 2B are illustrations of cross-sectional views of yolk/CNT shell structures of the present invention where (A) the yolk contacts a portion of the shell (less than 50% of the surface area of the yolk contacts the shell) and (B) the yolk does not contact the shell.
Figure 2B:
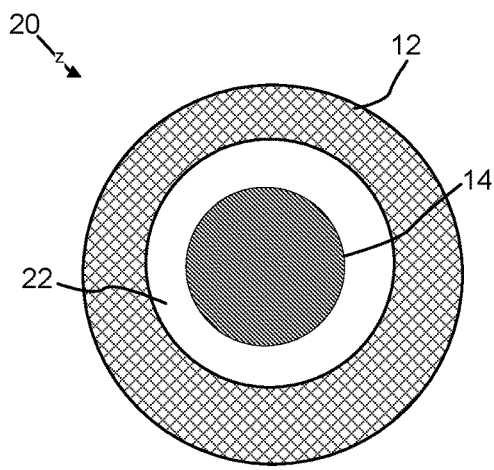

The yolk/CNT shell structure of the present invention includes a nanostructure contained within a discrete void space that is present in the carbon nanotube shell. FIGS. 2A and 2B are cross-sectional illustrations of a yolk/CNT shell structure 20. The carbon nanotube material 20 has a shell 12, yolk material 16 (the core 14 and yolk 16 can be the same material with the difference being that at least 50% of the surface of the core 14 contacts the shell 12, whereas less than 50% of the surface of the yolk 16 contacts the shell 12), and void space 22. As discussed in detail below, the void space 22 can be formed by removal of portions of the nanostructure via an etching process. The wall defining the void space 22 can be a portion of the carbon nanotube network/shell 12. As shown in FIG. 2A, the yolk 16 contacts a portion of the shell 12. As shown in FIG. 2B, the yolk 16 does not contact the shell 12. In certain aspects, 0.1% to 49%, 30% to 40%, or 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 36%, 37%, 38%, 39%, 40%, 41%, 42%, 43%, 44%, 45%, 46%, 47%, 48%, up to less than 50% or any range or value there between, of the surface of the yolk 16 contacts the shell 12. A diameter of the yolk 16 can range from 1 nm to 1000 nm, preferably 1 nm to 50 nm, or more preferably 1 nm to 5 nm or any value or range there between.

3. Hollow CNT Shell

Figure 3:
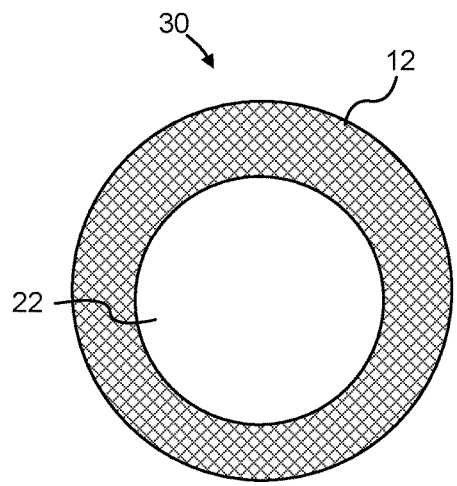
FIG. 3 is an illustration of a cross-sectional view of a hollow CNT shell of the present invention having a single discrete void space.

The hollow CNT shell structure of the present invention can include a single discrete void space encapsulated in the carbon nanotube network of the shell. FIG. 3 is cross-sectional illustration of a hollow CNT shell structure 30 having the shell 12 and a discrete void space 22. The void space 22 can be made by removal of all or substantially all of the core material 14 or by the graphitization of a hollow polymeric matrix described below. The average volume of the void space can be adjusted or tuned to meet specific requirements for chemical or material applications. In some instances, the average volume of the void space is 1 nm$^3$ to 10$^6$ μm$^3$, 5 nm$^3$ to 10$^5$ μ$^3$, 10 nm$^3$ to 10$^4$ μm$^3$, 20 nm$^3$ to 10$^3$ μm$^3$, 50 nm$^3$ to 10$^2$ μm$^3$, or any range or value there between.

4. Additional Structures

In addition to the structures discussed above, a multitude of other structures for the materials of the present invention can be obtained. By way of example, any one of the aforementioned core/CNT shell, yolk/CNT shell, and hollow CNT shell structures can be subjected to a further coating process. For instance, a silica coating, a titania coating, or an alumina coating, or any combination thereof, can be added to the materials of the present invention. Channels or pores in the coating can be created by selectively removing portions of the coatings.

In addition, multiple layered architectures of the aforementioned structures can be obtained. By way of example, the processes for making these structures are described in detail below. The starting nanomaterials in step 1 of FIG. 4 discussed below could be any one of the core/CNT shell, yolk/CNT shell, and hollow CNT shell structures. Therefore, multi-layered architectures can be obtained.

B. Preparation of Carbon Nanotube Materials

Figure 4:
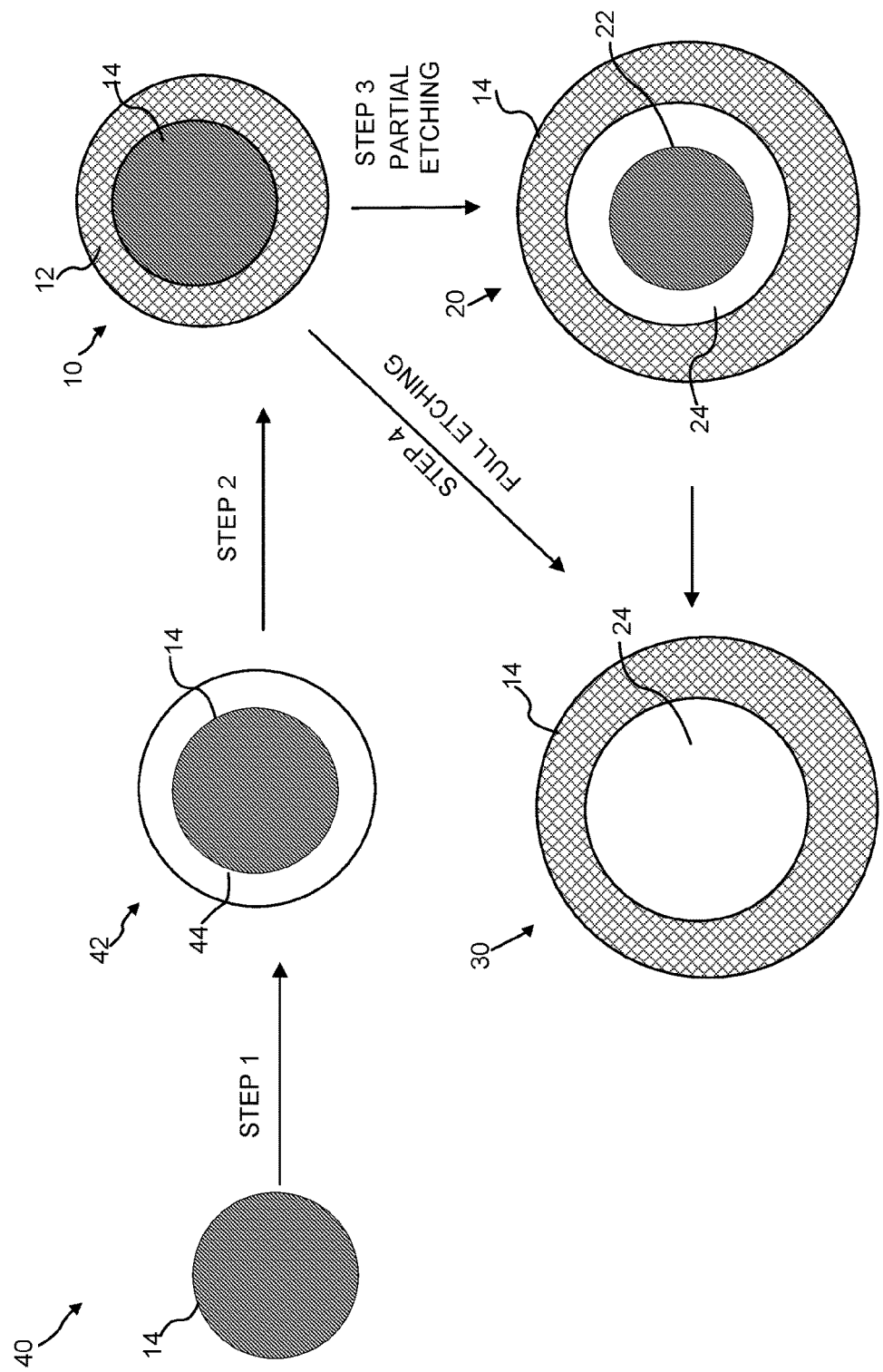
FIG. 4 is a schematic of an embodiment for making the core/CNT shell, yolk/CNT shell, and hollow CNT shell structures of the present invention.
Figure 5:
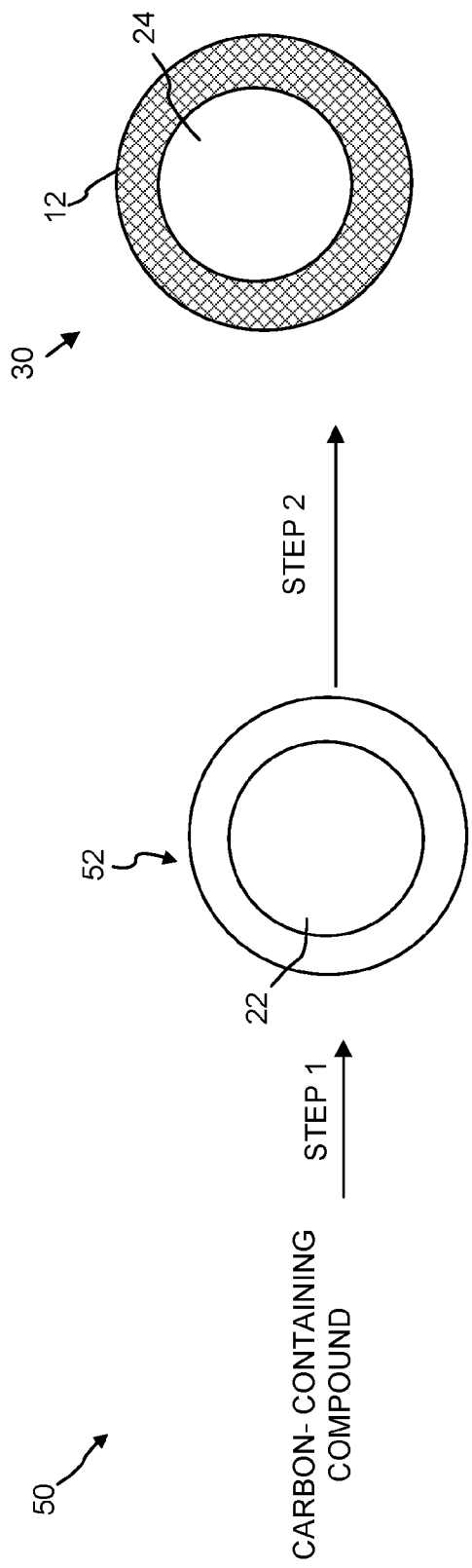
FIG. 5 is a schematic of an embodiment for making the hollow CNT shell structure of the present invention having a single discrete void space.

FIG. 4 is a schematic of a method of preparing carbon nanotube materials of the present invention from a core/polymeric matrix material. FIG. 5 is a schematic of a method of preparing a hollow CNT shell from a hollow polymeric matrix shell.

1. Preparation of a CNT Material From a Core/Polymeric Matrix Material

The core material (e.g., nano- or micro structures) can be made according to conventional processes (e.g., metal nano- or microstructures made using alcohol or other reducing processes) or purchased through a commercial vendor.

a. Formation of a Core/Polymeric Matrix

Referring to FIG. 4, step 1, the core material 14 can be dispersed in carbon-containing compound solution (e.g., a solution of one or more monomers, initiator, and/or a crosslinking agent) and subjected to conditions suitable to polymerize (e.g., emulsion polymerization) the carbon-containing compound to produce a core/polymeric matrix material 42 having a carbon containing polymeric matrix shell 44 and an encapsulated core 14. In one instance, nanostructures 14 can be dispersed in a mixture of solvent, water, one or more monomers, and/or a crosslinking agent using a Sonic Dismembrator (Fisher Scientific, Model 550). The resulting mini-emulsions can be purged with an inert gas (e.g., nitrogen) for a period of time (e.g., 10 min to 60 min). After adding the initiator, (e.g., potassium persulfate (KPS, about 0.1 wt.%)), the mixture can be heated to the appropriate temperature for polymerization (e.g., 50° C. to 100° C.). The resulted particles can be separated from the reaction mixture using known separation methods (e.g., centrifugation, filtration, and the like).

In some embodiments, the polymer-coated particles can be subjected to a cross-linking step. By way of example, the polymer coated particles can be adding to a solvent (e.g., chloroform) and contacted with a cross-linking agent (e.g., AlCl$_3$). The mixture can be heated (e.g., refluxed) under an inert atmosphere until the desired amount of crosslinking has occurred. (e.g., overnight, 10 to 12 hours). The solvent may be removed and the cross-linked silica particles can be washed with dilute acid (e.g., dilute HCl), collected (e.g. centrifuged), and washed with solvent (e.g. ethanol) to remove the water. The resulting silica/polymer particles can be dried under vacuum (e.g., 60° C. under vacuum overnight).

i. Carbon-Containing Compounds Used to Form the Matrix

The carbon-containing polymeric matrix shell 44 can be formed from carbon-containing compounds that form a polymeric matrix having ion exchange capabilities. Non-limiting examples of such compounds include functionalized polystyrene polymers, a functionalized siloxane-based polycarbonate polymer, sodium polystyrene sulfonate, amino-functionalized polystyrene resins, 2-acrylamido-2-methylpropane sulfonic acid, acrylic acid polymers, methacrylic acid polymers, or any combination thereof, and can be used as a carbon source for formation of the carbon nanotubes shell. These materials are commercially available from numerous commercial sources, for example, SABIC Innovative Plastics (USA), Dow Chemical (USA), Sigma Aldrich® (USA), BioRad (USA), Rapp Polymere GmbH (Germany). Crosslinking agents can be used to cross link the polymeric material. Non-limiting examples of cross-linking agents include divinylbenzene and benzoyl peroxide, which are commercially available from Sigma Aldrich® (USA) or Merck (Germany).

ii. Nano- and Microstructure Shapes and Materials

Non-limiting examples of nano- or microstructures that can be used in step 1 include structures having a variety of shapes and/or made from a variety of materials. By way of example, the nanostructures can have the shape of a wire, a particle (e.g., having a substantially spherical shape), a rod, a tetrapod, a hyper-branched structure, a tube, a cube, or mixtures thereof. In particular instance, the nanostructures are nanoparticles that are substantially spherical in shape. Selection of a desired shape has the ability to tune or modify the shape of the resulting void space 22.

Non-limiting examples of nano- or micros structure materials that can be used include a metal, a metal oxide, a silicon compound, a carbon-based compound (e.g., a single or multi walled carbon nanotube), a metal organic framework compound, a zeolitic imidazolated framework compound, a covalent organic framework compound, a zeolite, or any combination thereof. Examples of metals include noble metals, transition metals, or any combinations or any alloys thereof. Noble metals include silver (Ag), palladium (Pd), platinum (Pt), gold (Au), rhodium (Rh), ruthenium (Ru), rhenium (Re), iridium (Ir) or any combinations or alloys thereof. Transition metals include iron (Fe), copper (Cu), nickel (Ni), zinc (Zn), manganese (Mn), chromium (Cr), molybdenum (Mo), tungsten (W), osmium (Os), or tin (Sn), or any combinations or alloys thereof. In some embodiments, the nano- or micro structure includes 1, 2, 3, 4, 5, 6, or more transition metals and/or 1, 2, 3, 4 or more noble metals. The metals can be obtained from metal precursor compounds. For example, the metals can be obtained as a metal nitrate, a metal amine, a metal chloride, a metal coordination complex, a metal sulfate, a metal phosphate hydrate, metal complex, or any combination thereof. Examples of metal precursor compounds include, nickel nitrate hexahydrate, nickel chloride, cobalt nitrate hexahydrate, cobalt chloride hexahydrate, cobalt sulfate heptahydrate, cobalt phosphate hydrate, platinum (IV) chloride, ammonium hexachloroplatinate (IV), sodium hexachloroplatinate (IV) hexahydrate, potassium hexachloroplatinate (IV), or chloroplatinic acid hexahydrate. These metals or metal compounds can be purchased from any chemical supplier such as Sigma-Aldrich (St. Louis, Mo., USA), Alfa-Aeaser (Ward Hill, Mass., USA), and Strem Chemicals (Newburyport, Mass., USA). Metal oxides include silica ($SiO_2$), alumina ($Al_2O_3$), titania ($TiO_2$), zirconia ($ZrO_2$), germania ($GeO_2$), stannic oxide ($SnO_2$), gallium oxide ($Ga_2O_3$), zinc oxide (ZnO), hafnia ($HfO_2$), yttria ($Y_2O_3$), lanthana ($La_2O_3$), ceria ($CeO_2$), or any combinations or alloys thereof. In some embodiments, the core is a silicon dioxide nanoparticle. The $SiO_2$ nanoparticle can be made using a solution-based crystallization procedure from a silicon precursor. By way of example, a mixture of tetraethyl orthosilicate (TEOS) in alcohol can be added to basic aqueous alcoholic solution in a controlled manner (e.g., dropwise) with agitation (e.g., ultrasonic agitation) at 20 to 30° C. (e.g., room temperature). The basic aqueous alcoholic can be a 20 to 30 vol. % water/70 to 80 vol. % alcohol (e.g., ethanol) or 25 vol. % water to 75 vol % alcohol mixture that includes ammonium. The solution can be held for about 4 to 10 hours, and 3-methacryloyloxypropyltrimethoxysilane (MPS) can be added, and the reaction can be agitated until silica particles of a desired size are produced (e.g., about 70 to 75 hours). A molar ratio of TEOS:MPS can range from 5:1 to 10:1, 6:1 to 9:1, 7:1 to 8:1 or about 7:1. The resultant silica particles can be purified using known methods (e.g., repeated centrifugation, decantation, and resuspension in ethanol with ultrasonic bathing), then dried under vacuum at 40 to 60° C. or about 50° C. until constant weight. The resulting $SiO_2$ nanoparticles can have a diameter of around 175 to 225 nm, or about 175, 180, 185, 190, 195, 200, 205, 210, 215, 220, or 225 nm.

MOFs are compounds having metal ions or clusters coordinated to organic molecules to form one-, two-, or three-dimensional structures that can be porous. In general, it is possible to tune the properties of MOFs for specific applications using methods such as chemical or structural modifications. One approach for chemically modifying a MOF is to use a linker that has a pendant functional group for post-synthesis modification. Any MOF either containing an appropriate functional group or that can be functionalized in the manner described herein can be used in the disclosed carbon nanotubes Examples include, but are not limited to, IRMOF-3, MOF-69A, MOF-69B, MOF-69C, MOF-70, MOF-71, MOF-73, MOF-74, MOF-75, MOF-76, MOF-77, MOF-78, MOF-79, MOF-80, DMOF-1-$NH_2$, UMCM-1-$NH_2$, and MOF-69-80. Non-limiting examples of zeolite organic frameworks include zeolite imidazole framework (ZIFs) compounds such as ZIF-1, ZIF-2, ZIF-3, ZIF-4, ZIF-5, ZIF-6, ZIF-7, ZIF-8, ZIF-9, ZIF-10, ZIF-11, ZIF-12, ZIF-14, ZIF-60, ZIF-62, ZIF-64, ZIF-65, ZIF-67, ZIF-68, ZIF-69, ZIF-70, ZIF-71, ZIF-72, ZIF-73, ZIF-74, ZIF-75, ZIF-76, ZIF-77, ZIF-78, ZIF-79, ZIF-80, ZIF-81, ZIF 82, ZIF-86, ZIF-90, ZIF-91, ZIF-92, ZIF-93, ZIF-95, ZIF-96, ZIF-97, ZIF-100 and hybrid ZIFs, such as ZIF-7-8, ZIF-8-90. Covalent organic frameworks (COFs) are periodic two- and three-dimensional (2D and 3D) polymer networks with high surface areas, low densities, and designed structures. COFs are porous, and crystalline, and made entirely from light elements (H, B, C, N, and O). Non-limiting examples of COFs include COF-1, COF-102, COF-103, PPy-COF 3 COF-102-$C_{12}$, COF-102-allyl, COF-5, COF-105, COF-108, COF-6, COF-8, COF-10, COF-11 Å, COF-14 Å, COF-16 Å, OF-18 Å, TP-COF 3, Pc-PBBA, NiPc-PBBA, 2D-NiPc-BTDA COF, NiPc COF, BTP-COF, HHTP-DPB, COF-66, ZnPc-Py, ZnPc-DPB COF, ZnPc-NDI COF, ZnPc-PPE COF, CTC-COF, H2P-COF, ZnP-COF, CuP-COF, COF-202, CTF-1, CTF-2, COF-300, COF-LZU, COF-366, COF-42 and COF-43. Non-limiting examples of zeolites include Y-zeolites, beta zeolites, mordenite zeolites, ZSM-5 zeolites, and ferrierite zeolites. Zeolites may be obtained from a commercial manufacturer such as Zeolyst (Valley Forge, Pa., U.S.A.).

The amount of core material (e.g., a nanoparticle or a microparticle) in the carbon nanotube material depends, inter alia, on the use of the carbon nanotube material. In some embodiments when the carbon nanotube material is used as a catalyst, the amount of catalytic metal present in the particle(s) in the core or yolk ranges from 0.01 to 100 parts by weight of "active" catalyst structure per 100 parts by weight of catalyst, from 0.01 to 5 parts by weight of "active" catalyst structure per 100 parts by weight of catalyst. If more than one catalytic metal is used, the molar percentage of one metal can be 1 to 99 molar % of the total moles of catalytic metals in the catalytic core or yolk(s).

The metal or metal oxide nano- or microstructures can be stabilized with the addition of surfactants (e.g., CTAB, PVP, etc.) and/or through controlled surface charge. When surfactants are used, a yolk/CNT shell structure or a discrete void structure can be obtained after etching. In other examples, the "active" portion of the core material can be surrounded by a metal oxide (e.g., silica) and the silica can be removed during the etching process to form a yolk-shell structure. When a controlled surface charge process is used, a core/shell structure can be obtained.

The core material can also include a catalyst (e.g., iron) capable of catalyzing the formation of the carbon nanotubes from the carbon-containing polymeric matrix in addition to the "active" material needed for the targeted application. In some embodiments, the core material is the nano-or micro structure and is removed to form the discrete void space in the carbon nanotube network.

b. Graphitization of the Polymeric Matrix and Formation of the Carbon Nanotube Network In step 2, after the core/polymeric matrix material 42 is formed, it can then be subjected to a graphitization process to convert the carbon containing polymeric matrix 44 into the carbon nanotube network/shell 12. In one non-limiting aspect, the graphitization process described in Zhang et al. (*Angew. Chem. Int. ed.*, 2012, 51, 7581-7585) can be used. The core/polymeric matrix structure 42 can be subjected to an ion exchange process to load a graphitization catalyst (e.g., iron) into the polymeric matrix. For instance, a potassium ferricyanide solution can be used to load iron into a styrene-divinylbenzene copolymer matrix. The weakly adsorbed ions can then be removed through a water wash and the ion-exchanged polymeric matrix can be dried. In some embodiments, the ion exchange process is not necessary as the metal catalyst can be included in the core material 14.

The core/polymeric matrix material 42 can be heated at a temperature of 400 to 1000° C., 500 to 950° C., 600 to 900° C., or 800° C. under an inert atmosphere (e.g., argon atmosphere) for 0 to 20 hours to graphitize the carbon-containing compound into a carbon nanotube network, which forms the CNT shell 12. The carbon nanotube network is formed around the core material, thereby encapsulating the core material 14 in the carbon nanotube network 12. The graphitized compound can be cooled steadily to room temperature and the graphitization catalyst can be removed, if necessary, by refluxing in an appropriate catalyst removing solution (e.g., a solution of $HNO_3$ to remove an iron catalyst) to form a core/CNT shell material 10.

Notably, the carbon nanotube network 12 is comprised mainly of individual carbon nanotubes (either single walled or multi-walled CNTs can be used or combinations thereof). The network 12 acts as a continuous phase or matrix in which core 14 and/or void 22 is encapsulated. In preferred embodiments, the carbon nanotube network 12 consists essentially of carbon nanotubes or is entirely made up of carbon nanotubes. In other embodiments, however, the network 12 can be impregnated or loaded with other materials in addition to the carbon nanotubes. By way of example, during the step 1 process, additional materials can be dispersed into the solution having carbon containing compounds. Alternatively, and after step 2 has been performed, the outer surface of the produced carbon nanotube material can be loaded with the additional materials. In either instance, the additional materials can be other polymers, metal particles, metal oxide particles, silicon particles, carbon-based particles, MOFs, ZIFs, COFs, or any combination thereof.

Further, the thickness of the carbon nanotube network 12 can be modified or tuned as desired by limiting the amount of the solution used in step 1 or by increasing the amount and or size of the nanomaterials used in step 1. In either instance, the ratio of the solution having the carbon containing compound to the nanomaterials dispersed therein can result in a desired thickness of the resulting network 12. By way of example, the thickness of the network can be 0.5 nm to 1000 nm, 10 nm to 100 nm, 10 nm to 50 nm, or 10 nm, 11 nm, 12 nm, 13 nm, 14 nm, 15 nm, 16 nm, 17 nm, 18 nm, 19 nm, 20 nm, 21 nm, 22 nm, 23 nm, 24 nm, 25 nm, 26 nm, 27 nm, 28 nm, 29 nm, 30 nm, 31 nm, 32 nm, 33 nm, 34 nm, 35 nm, 36 nm, 37 nm, 38 nm, 39 nm, 40 nm, 41 nm, 42 nm, 43 nm, 44 nm, 45 nm, 46 nm, 47 nm, 48 nm, 49 nm, 50 nm, or any range or value there between. In some embodiments, the network can be considered to be "thin," "medium," or "thick". A thin network 12 can have a thickness of several nanometers, or 0.5 nm to 10 nm. A thick network 12 can have a thickness of 50 nm to 1000 nm. A medium network can have a thickness that overlaps the thin and thick ranges (i.e., 10 nm to 50 nm). By controlling the thickness of the network, the interfacial chemistry of the produced material can be obtained.

In preferred aspects, the carbon nanotube network 12 has a substantially spherical shape. However, other shapes are contemplated in the context of the present invention. By way of example, shapes such as cubes, pyramids, rectangular box, etc. can be used. Notably, the diffusion transport (flow flux or permeability) of the carbon nanotube network 12 can range from $1 \times 10^{-6}$ to $1 \times 10^{-4}$ mol $m^{-2}s^{-1}Pa^{-1}$ or $1 \times 10^{-5}$ mol $m^{-2}s^{-1}Pa^{-1}$. Still further, the network 12 can have a surface area of 200 to 1000 $m^2g^{-1}$. The produced carbon nanotubes can be open ended and can have a diameter of form 10 to 300 nm.

c. Formation of Yolk/CNT Shell and Hollow CNT Shell Structures

In steps 3 and 4, the produced core/CNT shell material 10 can be converted into a yolk/CNT shell material 20 (step 3) or a hollow CNT shell material 30 (step 4). To form the yolk/CNT shell material 20, the core/CNT shell material 10 can be contacted with an etching solution (e.g., immersed in 10 wt. % HF aqueous solution) for a desired amount of time (e.g., for 5 to 30 minutes) to partially (step 3) remove the core material 14 from the carbon nanotube network 12 to form a yolk 16. To form the hollow CNT shell material 30, the core/CNT shell material 10 can be contacted with an etching solution for a longer period of time to completely remove the core 14 from the carbon nanotube network 12 to form a single discrete void space 24 where the core 14 used to be. Alternatively, higher concentration of the etching agent, or more powerful etching agents can be used at a similar etching period of time to obtain the desired core/CNT shell material. Non-limiting examples of etching agents that can be used include hydrofluoric acid (HF), ammonium fluoride ($NH_4F$), the acid salt of ammonium fluoride ($NH_4HF_2$), sodium hydroxide (NaOH), nitric acid ($HNO_3$), hydrochloric acid (HCl), hydroiodic acid (HI), hydrobromic acid (HBr), boron trifluoride ($BF_3$), sulfuric acid ($H_2SO_4$), acetic acid ($CH_3COOH$), formic acid (HCOOH), or any combination thereof. In a certain embodiments, HF, $NH_4F$, $NH_4HF_2$, NaOH or any combination thereof can be used (e.g., in instances where a silica coating is removed from the surface of the nanostructure). In some embodiments, $HNO_3$, HCl, HI, HBr, $BF_3$, $H_2SO_4$, $CH_3COOH$, HCOOH, or any combination thereof can be used (e.g., to remove an alumina coating from the surface of the nanostructure). In another embodiment, a chelating agent (e.g., EDTA) for $Al^{3+}$ can be added as an aid for faster etching of alumina in addition of above stated acids.

After the etching process, the produced yolk/CNT shell material 20 or hollow CNT shell material 30 can be isolated from the etching solution using conventional separation techniques (e.g., centrifugation) and washed to remove any residual etching solution (e.g., washed with alcohol) and dried. In some embodiments, the carbon nanomaterials 20 and 30 can be subjected to steps 1 through 4 to form layers of carbon nanotube materials. By way of example, carbon nanotube material 20 can be subjected the steps 1 through 4 with carbon nanotube material 20 being used as the nanoparticle. The resulting carbon nanotube material would have two layers of a carbon nanotube network surrounding the nanostructure.

2. Preparation of a Carbon Nanotube Material From a Hollow Polymeric Matrix a. Formation of a Hollow Polymeric Matrix Referring to FIG. 5, step 1, The carbon-containing solution described above (See, Section i) can be polymerized using conventional emulsion polymerization methods to form a hollow polymeric matrix material 50 having a polymeric matrix shell 52 and a discrete void space 22 therein. For instance the emulsion polymerization method can involve polymerization of an emulsion that includes the carbon-containing compound, an optional crosslinking agent, and a surface-active agent. The polymerization can be initiated by a water-soluble initiator. In some embodiments, the polymerization is performed under oxygen-excluding conditions, such as using inert gas atmosphere and deoxygenated solutions and emulsions. The choice of surface-active agents and initiators will be apparent to one skilled in this art. In one instance, one or more monomers, vinyl-/acryl-/allyl-based derivatives, and/or a crosslinking agent, water and solvent can be mixed (e.g., via sonication using a Sonic Dismembrator (Fisher Scientific, Model 550)). The resulting emulsions can be purged with nitrogen for a desired period of time (e.g., 20 min). After adding an initiator such as potassium persulfate (KPS, about 0.1 wt. %), the mixture can be heated to the appropriate polymerization temperature (e.g., 60° C. to 80° C., or 70° C.). The resulted particles can be separated from the reaction mixture by using known particle separation methods (e.g., centrifugation, filtration, and the like).

b. Graphitization of the Polymeric Matrix and Formation of the Hollow CNT Shell

In step 2, after the polymeric matrix material shell 52 is formed, it can then be subjected to a graphitization process to convert the matrix 52 into the carbon nanotube network 12 as described above (See, Section 1.b). The carbon nanotube network 12 is formed around the discrete void 22, thereby creating the hollow CNT shell 30. The produced CNT shell 30 can then be cooled steadily to room temperature. A graphitization catalyst (e.g., Fe) can be removed, if necessary, by refluxing in an appropriate catalyst removing solution (e.g., a solution of $HNO_3$ to remove an iron catalyst).

The carbon nanotube network 12 can have the same features as those described above in section 1.b. For instance, the network can mainly consist of individual carbon nanotubes (either single walled or multi-walled CNTs can be used or combinations thereof) and can be present as a continuous phase or matrix in which the void is encapsulated therein. Similarly, the network 12 can be impregnated or loaded with other materials in addition to the carbon nanotubes. By way of example, during the step 1 process, additional materials can be dispersed into the solution having carbon containing compounds. Alternatively, and after step 2 has been performed, the outer surface of the produced carbon nanotube material can be loaded with the additional materials. In either instance, the additional materials can be other polymers, metal particles, metal oxide particles, silicon particles, carbon-based particles, MOFs, ZIFs, COFs, or any combination thereof.

In addition, the thickness of the carbon nanotube network 12 can be modified or tuned as desired by limiting the amount of the solution used in step 1. By way of example, the thickness of the network can be 0.5 nm to 1000 nm, 10 nm to 100 nm, 10 nm to 50 nm, or 10 nm, 11 nm, 12 nm, 13 nm, 14 nm, 15 nm, 16 nm, 17 nm, 18 nm, 19 nm, 20 nm, 21 nm, 22 nm, 23 nm, 24 nm, 25 nm, 26 nm, 27 nm, 28 nm, 29 nm, 30 nm, 31 nm, 32 nm, 33 nm, 34 nm, 35 nm, 36 nm, 37 nm, 38 nm, 39 nm, 40 nm, 41 nm, 42 nm, 43 nm, 44 nm, 45 nm, 46 nm, 47 nm, 48 nm, 49 nm, 50 nm, or any range or value there between. In some embodiments, the network can be considered to be "thin," "medium," or "thick". A thin network 12 can have a thickness of several nanometers, or 0.5 nm to 10 nm. A thick network 12 can have a thickness of 50 nm to 1000 nm. A medium network can have a thickness that overlaps the thin and thick ranges (i.e., 10 nm to 50 nm). By controlling the thickness of the network, the interfacial chemistry of the produced material can be obtained.

In preferred aspects, the carbon nanotube network has a substantially spherical shape. However, other shapes are contemplated in the context of the present invention. By way of example, shapes such as cubes, pyramids, rectangular box, etc. can be used. Notably, the diffusion transport (flow flux or permeability) of the carbon nanotube network 12 can range from $1\times10^{-6}$ to $1\times10^{-4}$ mol $m^{-2}s^{-1}Pa^{-1}$ or $1\times10^{-5}$ mol $m^{-2}s^{-1}Pa^{-1}$. Still further, the network 12 can have a surface area of 200 to 1000 $m^2g^{-1}$. The produced carbon nanotubes can be open ended and can have a diameter of form 10 to 300 nm.

C. Uses of the Carbon Nanotube Material

The produced CNT material of the present invention can be used in a variety of chemical reactions. Non-limiting examples of chemical reactions include a hydrocarbon hydroforming reaction, a hydrocarbon hydrocracking reaction, a hydrogenation of hydrocarbon reaction, and/or a dehydrogenation of hydrocarbon reaction. The methods used to prepare the carbon nanotube material catalysts can tune the size of the core, the catalytic metal particles, dispersion of the catalytic metal-containing particles in the core, the porosity and pore size of the shell or the thickness of the shell to produce highly reactive and stable multi-core/carbon nanotube shell catalysts for use in a chosen chemical reaction.

The CNT materials can also be used in a variety of energy storage applications (e.g., fuel cells, batteries, supercapacitors, and electrochemical capacitors), optical applications, and/or controlled release applications. In some aspects, a lithium ion battery includes (e.g., an anode electrode and/or a cathode electrode) the previously described carbon nanotube material or multi-core/carbon nanotube shell material. In some embodiments, the carbon nanotube material includes one or more nanostructures suitable for controlled release including those for medical applications.

EXAMPLES

The present invention will be described in greater detail by way of specific examples. The following examples are offered for illustrative purposes only, and are not intended to limit the invention in any manner. Those of skill in the art will readily recognize a variety of noncritical parameters, which can be changed or modified to yield essentially the same results.

Example 1

Synthesis and Characterization of Modified Silica Nanoparticles

A mixture of tetraethyl orthosilicate (TEOS, 80 mL, 0.36 moles) in ethanol (100 mL) was added dropwise to a mixture of ethanol (500 mL), water (50 mL), and ammonium (8 mL, 25% aqueous solution, ultrasonic 30 minutes) with vigorous stirring at room temperature. After 6 hours, [3-(methacryloyloxy)propyl]trimethoxysilane (MPS, 12 mL, 0.05 moles) was added and the reaction was stirred for a further 72 hours. The resultant silica particles were then purified by three cycles of centrifugation, decantation, and resuspension in ethanol with ultrasonic bathing. The silica particles were dried in a vacuum oven at 50° C. until constant weight.

Figure 6:
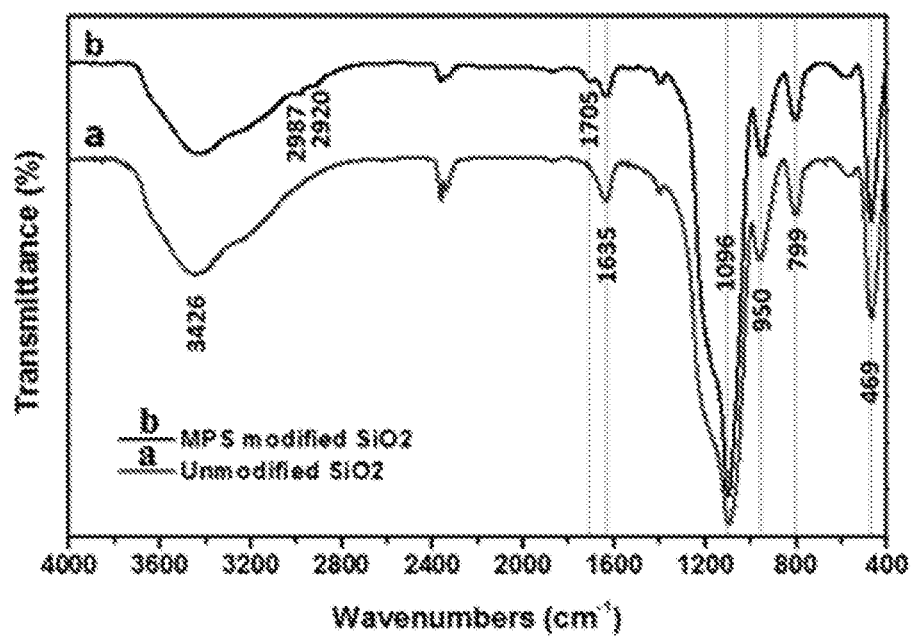
FIG. 6 is a Fourier Transform infrared (FT-IR) spectrum of unmodified and modified silica nanoparticles.
Figure 7:
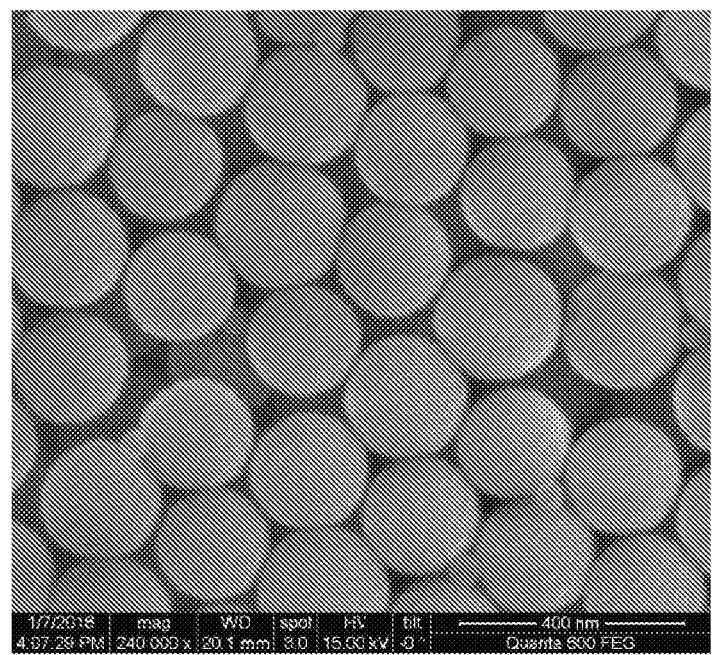
FIG. 7 is a scanning electron microscopy (SEM) image of modified $SiO_2$ particles.

FIG. 6 shows the FT-IR spectra of unmodified and MPS modified silica nanoparticles. The both FT-IR spectra of unmodified and MPS modified silica nanoparticles exhibit a very strong absorption band at 1096 $cm^{-1}$ attributing to the stretching vibration of Si—O—Si groups, while the bending modes of these groups correspond to the band observed at 469 $cm^{-1}$. The peak at 799 $cm^{-1}$ was assigned to Si—O stretching vibration. The absorption bands at 3426 and 1635 $cm^{-1}$ were due to the H—O—H stretching and bending modes of the absorbed water, respectively. In the spectra of MPS modified silica particles, the absorption at 1705 and 2920 $cm^{-1}$ are related to the C=O functional groups and stretching vibrations of —$CH_2$. The spectrum confirms that the organic functional groups were successfully incorporated onto the surface of silica nanoparticles. FIG. 7 shows the SEM image of MPS modified $SiO_2$ particles with diameter of around 200 nm.

Example 2

Synthesis and Characterization of $SiO_2$/Polystyrene Co-Polymer Core/Shell Particles ($SiO_2$/PS)

MPS grafted silica particles (2 g, Example 1) were dispersed in 200 ml of ethanol by Sonic Dismembrator (Fisher Scientific, Model 550, U.S.A.), and then polyvinylpyrrolidone (PVP, Mw=36000, 2 g), 2,2'-azobis(2-methylpropionitrile) (AIBN, 0.2 g), styrene (17.2 mL), divinylbenzene (1.4 mL) and 4-vinylbenzyl chloride (1.4 mL) was added to the dispersion.

Figure 8:
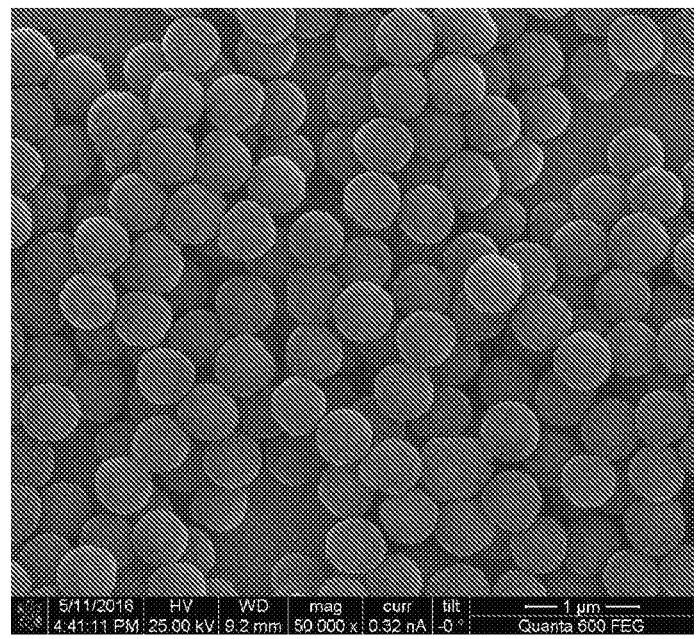
FIG. 8 is a SEM image of $SiO_2$/Polystyrene ($SiO_2$/PS) core-shell particles of the present invention.
Figure 9:
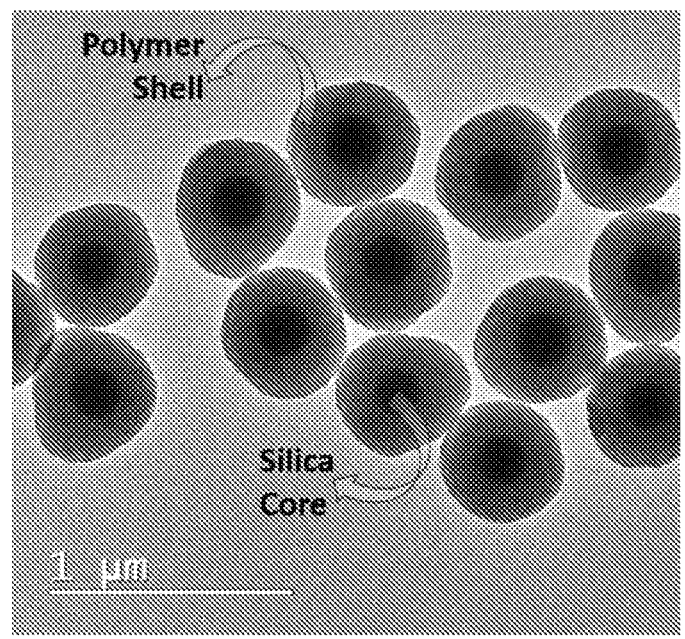
FIG. 9 is a transmission electron microscopy (TEM) image of $SiO_2$/PS core-shell particles of the present invention.

After bubbling nitrogen through the reaction medium for 30 min, the polymerization was carried out at 70° C. for 24 h. The white precipitation was centrifuged, washed sequentially with ethanol (4 times) to remove the excess monomer and initiator, and then dried subsequently dried in air. FIG. 8 shows the SEM image of $SiO_2$/PS core-shell particles with a diameter around 490 nm. FIG. 9 shows the TEM image of $SiO_2$/PS core-shell particles. A core-shell structure is observed, which shows that $SiO_2$ particles (dark cores) were encapsulated by polystyrene copolymer (grey shell).

Example 3

Post-Cross-Linking of $SiO_2$/PS ($SiO_2$/X-PS)

A mixture of $SiO_2$/PS (1 g) from Example 2, $CHCl_3$ (60 mL) and $AlCl_3$ (3 g) in a 250 mL, three-necked, round bottom flask equipped with a polytetrafluoroethylene-bladed paddle and a water-cooled condenser was refluxed overnight under $N_2$. After removing the solvent, HCl (2%, 50 mL) was added. The product was collected and purified by centrifuge and washing with ethanol (15 mL×3). The resultant yellow powder was collected and dried at 60° C. under vacuum overnight.

Example 4

Ion-Exchange of $SiO_2$/X-PS ($SiO_2$/X-PS-Fe)

A mixture of $SiO_2$/X-PS (1 g) from Example 2 and trimethylamine (25 wt. % in water, 20 mL) was stirred for 24 hours at room temperature. The obtained solid was then washed with water until neutral pH and then mixed with NaOH (2%, 20 mL) and stirred for 12 hours. After centrifuging and washing with $H_2O$ until neutral pH, $K_3[Fe(CN)_6]$ (1 g) was added and the mixture was stirred for 24 hours. The reaction mixture was then centrifuged and washed with $H_2O$ until neutral pH. A yellow powder was collected and dried at 60° C. under vacuum overnight.

Example 5

Figure 10:
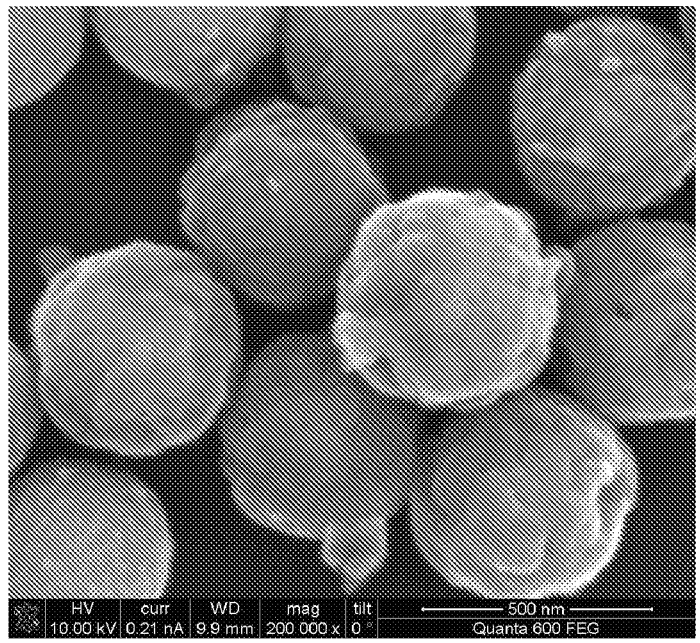
FIG. 10 is a SEM image of $SiO_2$/CNT core-shell particles or the present invention.
Figure 11:
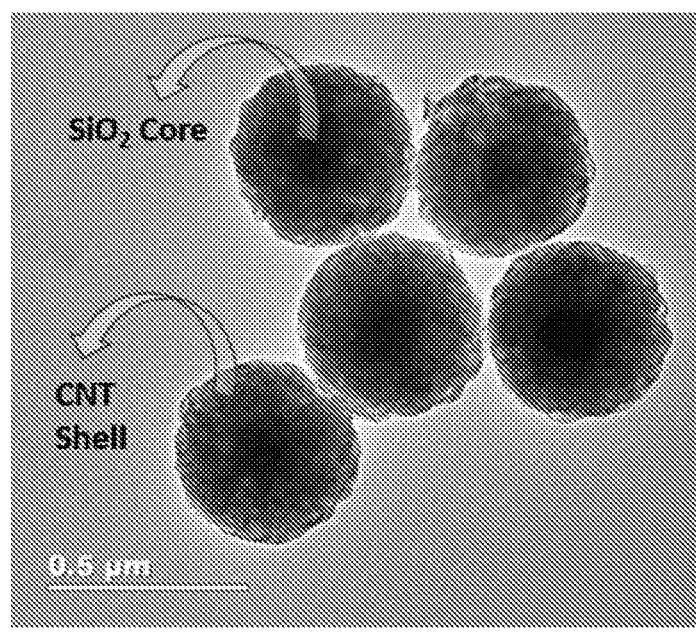
FIG. 11 is a TEM image of $SiO_2$/CNT core-shell particles of the present invention.
Figure 12:
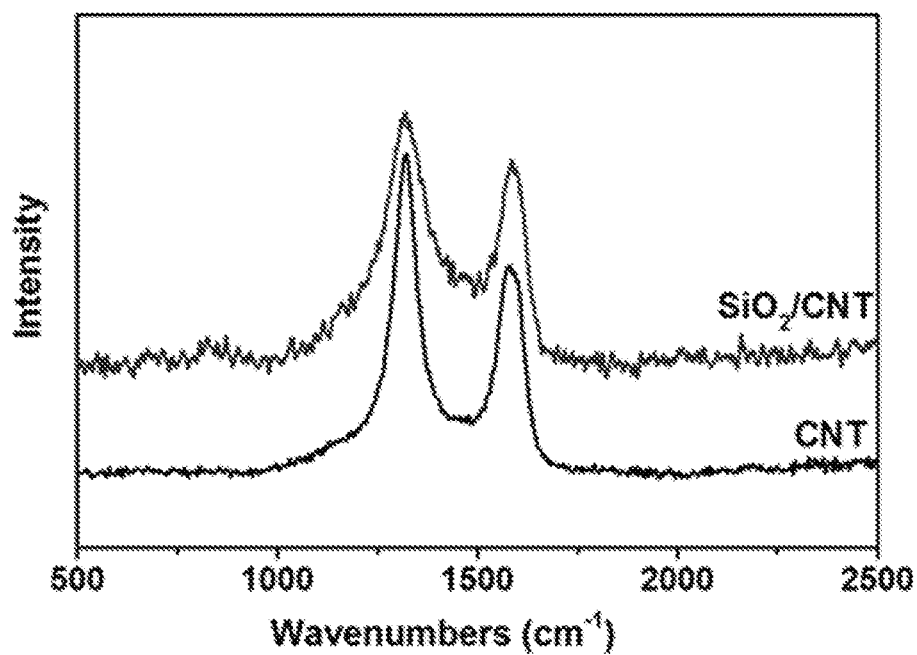
FIG. 12 is a Raman spectrum of commercial CNT and synthesized $SiO_2$/CNT.

Synthesis and Characterization of $SiO_2$/CNT $SiO_2$/X-PS-Fe (1 g) from Example 4 was loaded into tubular furnace and heated from room temperature to 310° C. at 2° C./min and then to 370° C. at 1° C./min, held for 2 hours, then heated to 800° C. at 10° C./min, and held for 4 h under argon (100 cc/min). After cooling to room temperature, 0.31 g of black powder was obtained. FIG. 10 shows the SEM image of $SiO_2$/CNT core/shell particles. A shell composed of short tubes was observed. FIG. 11 is the TEM image of $SiO_2$/CNT core/shell particles. The black silica core was observed surrounded by the CNT shell. FIG. 12 is the Raman spectra for synthesized $SiO_2$/CNT, which matches with commercial CNT as received.

Example 6

Synthesis and Characterization of CNT Hollow Spheres (CNT-HP)

Figure 13:
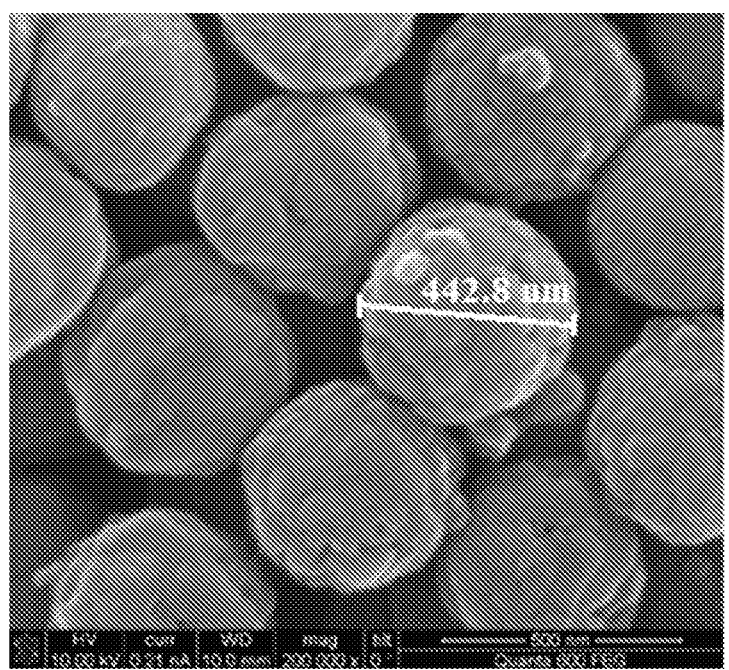
FIG. 13 is a SEM image of CNT hollow spheres of the present invention.
Figure 14:
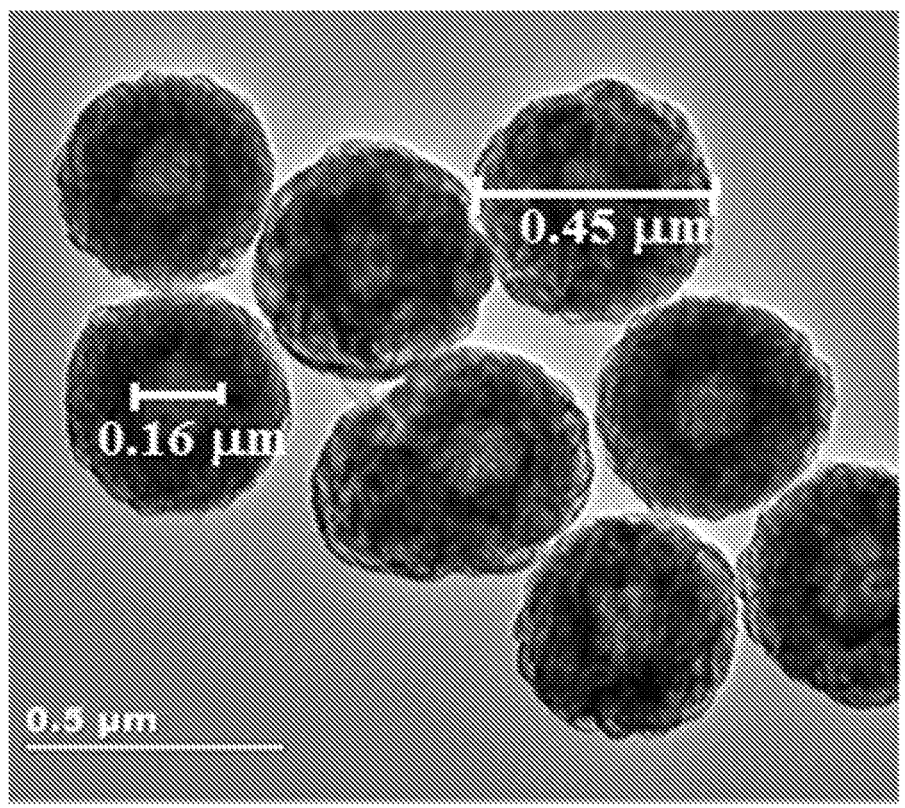
FIG. 14 is a TEM image of CNT hollow spheres of the present invention.

$SiO_2$/CNT (0.3 g) from Example 5 was refluxed in concentrated $HNO_3$ (20 mL) overnight. After washing with water until neutral pH, the black solid was mixed with 10% HF (10 mL) and stirred for 12 hours. After centrifugation and washing with water until neutral pH, the black powder was collected and dried at 60° C. under vacuum overnight. FIG. 13 shows the SEM image of CNT hollow spheres. FIG. 14 shows the TEM image of CNT hollow spheres. Silica cores disappear after HF treatment when compared with FIG. 11 as evidenced by the hollow portion in the CNT hollow spheres.

The invention claimed is:

1. A method of making a carbon nanotube material, the method comprising:
   (a) obtaining a carbon-containing polymeric matrix shell having an encapsulated core; and
   (b) subjecting the carbon-containing polymeric matrix shell to a graphitization process to form a shell having a carbon nanotube network from the matrix,
wherein a carbon nanotube material is obtained that includes a shell having a network of carbon nanotubes and the encapsulated core surrounded by the network of carbon nanotubes; and
partially etching away the encapsulated core surrounded by the network of carbon nanotubes such that encapsulated core fills 1% to 99% of the volume of the void space.

2. The method of claim 1, wherein the shell having the network of carbon nanotubes consists essentially of or consists of carbon nanotubes.

3. The method of claim 1, wherein the shell having the network of carbon nanotubes is a monolith network of carbon nanotubes.

4. The method of claim 1, wherein the carbon-containing polymeric matrix shell in step (a) has catalytic metal ions or has exchangeable ions that are exchanged for catalytic metal ions, the catalytic metal ions being capable of catalyzing the formation of the network of carbon nanotubes from the polymeric matrix shell during the step (b) graphitization process.

5. The method of claim 4, wherein catalytic metal ions are loaded into the polymeric matrix shell prior to or during the step (b) graphitization process.

6. The method of claim 4, further comprising removing catalytic metal ions from the carbon nanotube network shell after the step (b) graphitization process.

7. The method of claim 1, wherein the carbon containing polymeric matrix shell in step (a) comprises a polymer having ion exchange capabilities, wherein the polymer is a functionalized polystyrene polymer, a functionalized siloxane-based polycarbonate polymer, or a combination thereof.

8. The method of claim 1, further comprising cross-linking the polymeric matrix shell in step (a) or in step (b), or in both steps (a) and (b).

9. The method of claim 1, wherein the polymeric matrix is not cross-linked in either of steps (a) and (b).

10. The method of claim 1, wherein the step (b) graphitization process comprises heating the carbon-containing polymeric matrix shell for 400° C. to 1000° C. for a sufficient period of time, or from 1 minute to 50 hours, to form the shell having a carbon nanotube network.

11. The method of claim 1, wherein a core/CNT shell structure is obtained having the network of carbon nanotubes and the encapsulated core surrounded by the network of carbon nanotubes.

12. The method of claim 1, wherein the core material is a nano- or microstructure.

13. The method of claim 1, wherein the produced carbon nanotube material has a yolk/CNT shell structure.

14. The method of claim 1, wherein the encapsulated core comprises a metal nano- or microstructure or oxides or alloys thereof, a silicon nano- or microstructure, a carbon-containing nano- or microstructure, a metal oxide nanoparticle, a metal organic framework nano- or microstructure, a zeolitic organic framework nano- or microstructure, a covalent organic framework nano- or microstructure, or a zeolite nano- or microstructure, or any combination thereof.

15. The method of claim 1, wherein the shell having the network of carbon nanotubes further comprises a polymer, a metal, a metal oxide, silicon, a metal organic framework, a zeolitic organic framework, a covalent organic framework, a zeolite or any combination thereof dispersed throughout the network.

16. The method of claim 1, wherein the carbon nanotube is capable of catalyzing a chemical reaction, wherein the chemical reaction comprises at least one member selected from the group consisting of a hydrocarbon cracking reaction, a hydrogenation of hydrocarbon reaction, a dehydrogenation of hydrocarbon reaction, a 3-way catalytic environmental mitigation reaction for an automobile and an air remediation reaction.

17. A method of making a carbon nanotube (CNT) material, the method comprising:
   (a) obtaining a carbon-containing polymeric matrix shell having a single discrete void space defined by the carbon-containing polymeric matrix shell; and
   (b) subjecting the carbon-containing polymeric matrix shell to a graphitization process to form a shell having a carbon nanotube network from the matrix,
wherein a carbon nanotube material is obtained that includes a shell having a network of carbon nanotubes and a single discrete void space defined by the network of carbon nanotubes.

* * * * *